3.738.196

United States Patent
Kubo et al.

[45] June 12, 1973

[54] CONTROL SYSTEM FOR AN AUTOMATIC TRANSMISSION

[75] Inventors: Seitoku Kubo; Mashanao Hashimoto; Chihiro Hayashi, all of Toyota, Japan

[73] Assignee: Toyota Jidosha Kogyo Kabushiki Kaisha, Toyota-shi, Japan

[22] Filed: July 30, 1971

[21] Appl. No.: 167,593

[30] Foreign Application Priority Data
Nov. 21, 1970  Japan.............................. 45/103095

[52] U.S. Cl................................ 74/866, 74/752 A
[51] Int. Cl........................... B60k 21/00, F16h 3/74
[58] Field of Search....................................... 74/866

[56] References Cited
UNITED STATES PATENTS

| | | | |
|---|---|---|---|
| 3,052,134 | 9/1962 | Worster | 74/866 |
| 3,267,762 | 8/1966 | Reval | 74/866 X |
| 3,354,744 | 11/1967 | Kuhnle et al. | 74/866 X |
| 3,650,161 | 3/1972 | Ito et al. | 74/866 |

*Primary Examiner*—Arthur T. McKeon
*Attorney*—Cushman, Darby & Cushman

[57] ABSTRACT

In a vehicle automatic transmission of the type which performs the setting of shift points through electrical controls, a control system designed such that the transmission starts in the third speed under low engine load conditions, while the transmission starts in the first speed under high engine load conditions.

1 Claim, 8 Drawing Figures

CONTROL SYSTEM FOR AN AUTOMATIC TRANSMISSION

BACKGROUND OF THE INVENTION

1. Field of the Invention

The present invention relates to automatic transmissions and more particularly to a control system for an automatic transmission combining both electrical and hydraulic controls.

2. Description of the Prior Art

With the conventional automatic transmissions, when the transmission shift lever is placed in the forward or reverse drive position, the drive is transmitted to the driven wheels even under very low engine load conditions, thereby enabling the vehicle to run at a very low speed. Thus, when the vehicle comes to a halt at an intersection, for example, the driver must continue to apply the vehicle braking brakes, or alternatively he must move the transmission shift lever into the neutral position. While this may be advantageous at times when the vehicle comes to a temporary stop on a gentle slope or when the vehicle is driving on a jammed road, it is inconvenient in that the gear ratio of the first speed gear progressively increases as the number of reduction ranges increases and this inconvenience tends to be still apparent with the conventional automatic transmissions since the starting in the first speed as used in the conventional automatic transmissions provided a greater driving force. There is a further inconvenience in that a correspondingly large shock will be caused when a shift is made from the neutral position to any driving position and in addition the number of shifts required to obtain the top gear will be increased, thereby irritating the driver.

In order to eliminate these deficiencies, an attempt has been made to cause the transmisssion to start in the second speed or the third speed gear under low engine load conditions and start in the first speed gear under high engine load conditions. However, with the conventional automatic transmissions wherein the setting of shift points is controlled hydraulically, there are considerable problems in that engine load responsive signals representing, for example, the engine throttle positions must be supplied through the associated link mechanism to the transmission where the signals are converted into hydraulic pressures to effect the required controls, with the resultant disadvantages including inaccurate operation due to the inaccurateness and complexity of the link mechanism, unstable operations due to variations in the hydraulic pressure and the additional space required for accommodating the link mechanism.

SUMMARY OF THE INVENTION

The present invention contemplates effecting the above-mentioned controls electrically. In other words, the accurate and stable operations can be ensured by adding some electrical circuits to an automatic transmission of the conventional type which combines both the electrical and hydraulic controls. Moreover, according to the present invention, the transmission is caused to start in the third gear speed so that the driving force transmitted under low engine load conditions will be smaller than when the transmission is caused to start in the second speed, a smaller shock will be produced when shifting from the neutral position to the driving position, and the vehicle can remain in the third speed throughout the trip when no rapid acceleration is required. For deceleration of the vehicle under low engine load conditions, the vehicle can be retarded very smoothly to come to a complete standstill with the transmission kept in the third speed. Furthermore, with the automatic transmission according to the preferred embodiment of the invention which will be explained later, when ascending a hill the vehicle can be more easily halted and maintained so, than when the vehicle is moved off in the second speed. In other words, while the automatic transmission according to the preferred embodiment is provided with a one-way brake so that the rotation of the driving wheels in the reverse direction is prevented in the second and third speed gears, the second speed gear is provided by applying a single brake band and a single clutch and the brake band thus applied tends to slip against the rotation in the reverse direction, whereas two clutches are engaged to provide the third speed gear and a sufficient engagement is ensured against the rotation in the reverse direction so that in the third speed gear the vehicle can be prevented from moving in a reverse direction even when ascending a steep hill.

DESCRIPTION OF THE PREFERRED EMBODIMENT

Figure 1:
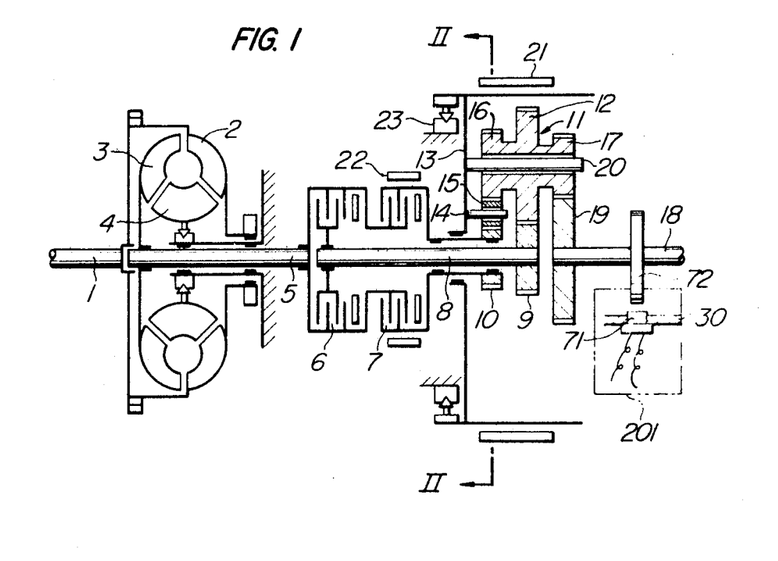
FIG. 1 is a schematic diagram of an example transmission incorporating the present invention showing the principle of the invention.
Figure 2:
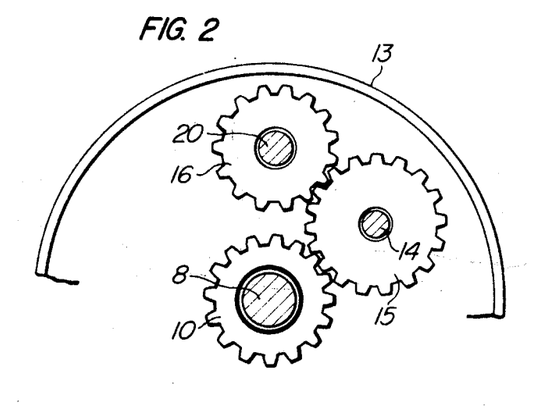
FIG. 2 is a fractional sectional view along a line II—II of FIG. 1 showing an idler gear not shown in FIG. 1 and the associated gears.

Referring to FIGS. 1 and 2 of the drawings, there is illustrated a three forward speed and reverse automatic transmission with a torque converter which is actuated by the control system of the present invention. The transmission comprises a torque converter, a planetary gear system, a hydraulic control system and an electrical control system, and the torque converter is of the conventional type which comprises a pump turbine 2, a turbine wheel 3 and a stator 4 with the pump turbine 2 being connected to an engine crankshaft 1 and the turbine wheel 3 being connected to a turbine shaft 5 to transmit the torque to the planetary gear system. The planetary gear system comprises two multi-disk clutch units 6 and 7 adapted to be engaged by hydraulic servo motors, two hydraulic brake band units 21 and 22, a one-way brake 23 employing sprags, and a planetary gear train comprising two sun gears 9 and 10 and a set of two or three pinion gears 11. The turbine shaft 5 is connected through the front clutch 6 to an intermediate shaft 8 carrying the input sun gear 9 and the shaft 5 is also connected to the reverse sun gear 10 through the rear clutch 7. The brake band unit 22 (hereinafter referred to as a front brake band) is disposed around the outer periphery of the rear clutch 7 to lock the reverse sun gear 10 and it is applied by the hydraulic servo. The input sun gear 9 is in mesh with a gear 12 of a suitable number (two or three) of the pinion gears 11 disposed around the periphery of the input sun gear 9. The reverse sun gear 10 is in mesh with an idler gear 15 carried on a carrier 13 and the idler gear 15 is in turn meshed with a gear 16 of the pinion gears 11. The rearmost gear 17 of the pinion gears 11 is in mesh with a gear 19 on an output shaft 18. The pinion gears 11 and the idler gear 15 are carried on the carrier 13 by pinion pins 20 and 14, and the carrier 13 is provided with the brake band unit 21 (hereinafter referred to as a rear brake band) which is applied by the hydraulic servo to lock the carrier 13. The carrier 13 is also provided with a one-way brake 23 which holds the carrier 13 against the rotation in one direction.

With the construction described above, the conditions obtainable in the transmission during the operations in the various gear positions will now be explained.

The forward first speed is obtained by engaging the front clutch 6 and the rear brake band 21. (However, when the drive is supplied from the engine side, the one-way brake 23 also comes into operation and thus the rear brake band 21 need not necessarily be applied. In this case, however, no power from the output shaft 18 will be transmitted.) The rotation of the turbine shaft 5 is transmitted to the input sun gear 9 so that since the carrier 13 is held stationary by the rear brake band 21 and hence the pinion pin 20 is also held stationary, the input rotation is transmitted from the input sun gear 9 to the gear 19 on the output shaft 18 at a reduced speed via the gear 12 and the gear 17.

In the second speed, the front clutch 6 and the front brake band 22 are engaged. The input rotation is carried through the input sun gear 9 so that the reverse sun gear 10 is locked and held stationary by the front brake band 22. By virtue of the reaction force of the reverse sun gear 10, the rotation of the input sun gear 10 causes the carrier 13 to rotate in the same direction as the input sun gear 9, thereby transmitting the rotation to the gear 19 on the output shaft 18 at a reduced speed.

The third speed is obtained by engaging the front clutch 6 and the rear clutch 7. Since the input is received through the both sun gears 9 and 10, the planetary gear set rotates as a unit and thus the turbine shaft 5 and the output shaft 18 rotate at a 1 : 1 ratio.

In reverse, the rear clutch 7 and the rear brake band 21 are applied. The carrier 13 and hence the pinion pins 14 and 20 are held stationary and thus the input rotation from the turbine shaft 5 is transmitted via the reverse sun gear 10 and the idler gear 15 and through the gear 16 and 17 to the gear 19 on the output shaft 18, thereby reversing the rotation of the output shaft 18.

Figure 3:
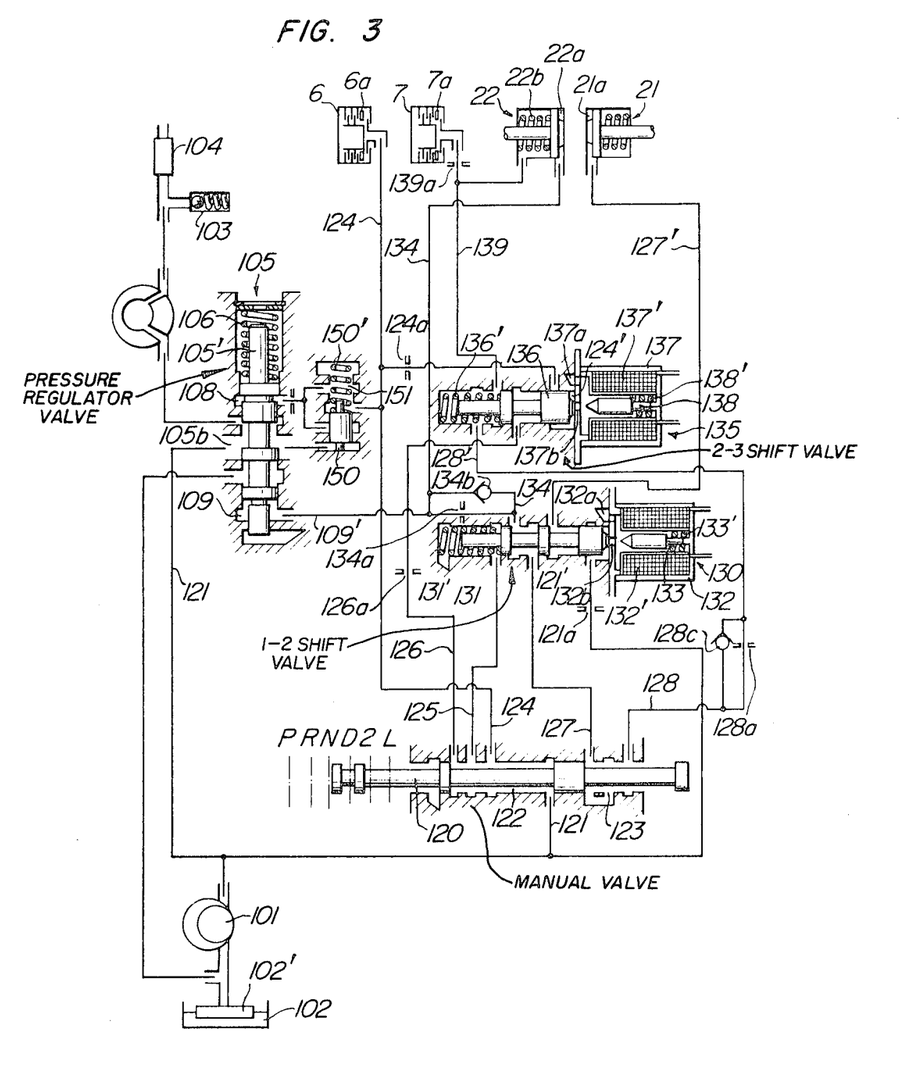
FIG. 3 and FIG. 4 are diagrams showing the hydraulic control circuit of the transmission with FIG. 3 showing the operating conditions in the D position — 1st gear and FIG. 4 showing the operating conditions in the D position — 3rd gear.
Figure 4:
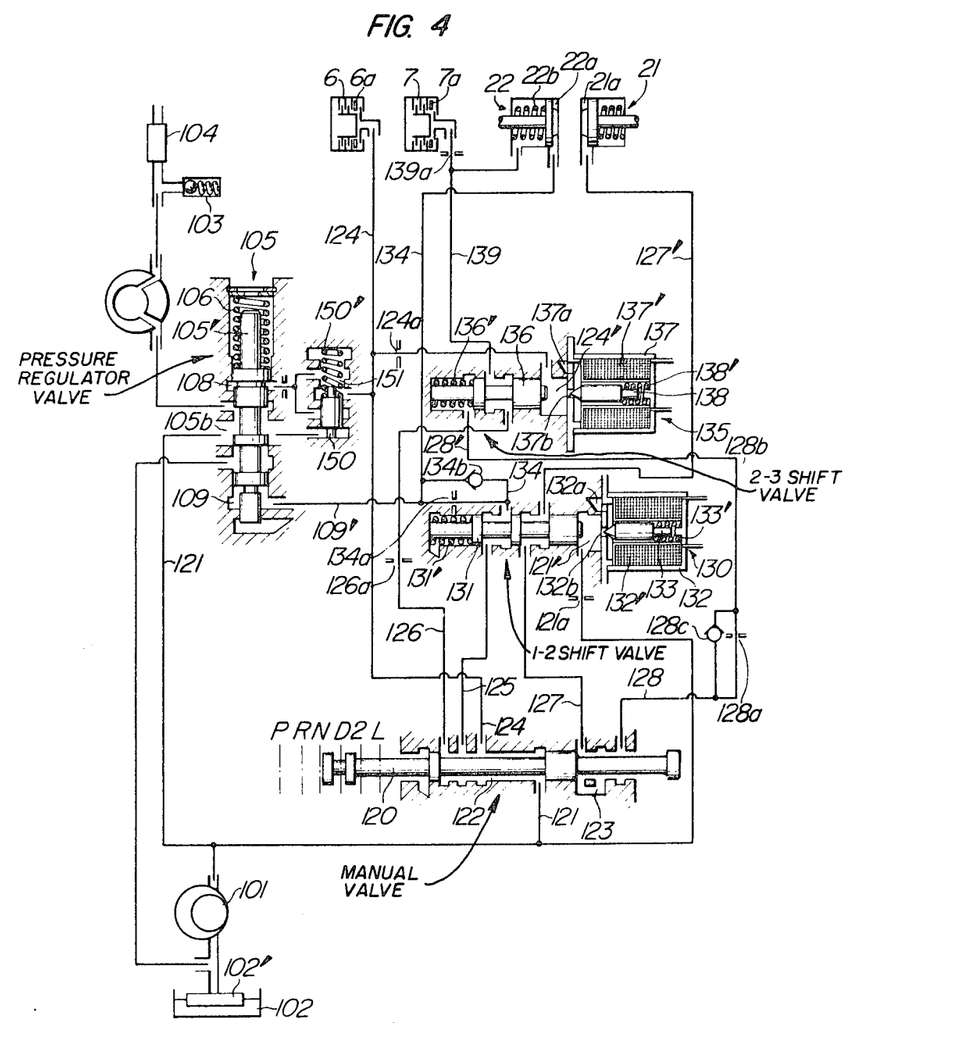

Next, the hydraulic control section shown in FIGS. 3 and 4 will be explained. FIG. 3 shows the conditions during operation in the first speed and FIG. 4 shows the conditions during operation in the third speed, with the transmission shift lever being placed in the D position in both cases. The oil under pressure required for the hydraulic actuation circuit is supplied from a pump 101 employing gears or vanes. The oil pump 101 is driven from the shaft directly connected to the engine so that the oil under pressure is delivered into an oil passage 121 from an oil reservoir 102 through an oil filter 102'. A pressure regulator valve 105 is of the type which is commonly used as a pressure regulator valve for automobile automatic transmissions and it comprises a spring 106 and a spool 105', so that the oil pressure admitted into oil chambers 108 and 109 having differential valve lands are balanced against the spring pressure of the spring 106 to perform a pressure regulating function. The oil pressure regulated in this way will be hereinafter referred to as a line pressure. The oil pressure applied to the oil chamber 108 is controlled by means of a manual valve 120 and a relay valve 150, while the oil pressure applied to the oil chamber 109 is controlled through a 1 – 2 shift means 130. With no oil pressure being supplied to an oil passage 124 from the manual valve 120, the oil pressure supplied to the oil chamber 108 is reduced by an amount equivalent to the spring pressure of a spring 150' to thereby increase the line pressure. On the other hand, the oil pressure to the oil chamber 109 is supplied when a shift valve 131 of the 1 – 2 shift means 130 is urged to its leftward position to communicate the oil passages 121, 125, 134 and 109' with one another, thereby reducing the line pressure. The oil pressure regulated by the pressure regulator valve 105 is supplied to the manual valve 120. The manual valve 120 is linked to the transmission shift lever installed in the driver's seat and as shown in FIG. 3, it has six positions : P, R, N, D, 2 and L.

With the manual valve 120 placed in the N position, the oil passage 121 is shut off and valve chambers 122 and 123 are opened. With the manual 120 in the D position, the conditions shown in FIG. 3 or FIG. 4 are obtained and the oil passage 121 communicates with the oil passages 124, 125 and 126. The oil passage 124 is directly connected to a front clutch servo chamber 6a, while the oil passage 125 is partly connected to a front brake band apply side servo chamber 22a through the 1 – 2 shift means 130 and also it is partly connected to the oil chamber 109 of the pressure regulator valve 105. The oil passage 126 is connected to a front brake band release side servo chamber 22b through a 2 – 3 shift means 135.

When the manual valve 120 is moved to the R position, the oil passages 124, 125 and 126 are exhausted and oil passages 127 and 128 communicate with the oil passage 121. The oil passage 127 is connected to a rear brake band apply side servo chamber 21a through the 1 – 2 shift means 130, and the oil passage 128 is connected to the rear clutch servo chamber 7a and the front brake band release side servo chamber 22b through the 2 – 3 shift means 135.

The 1 – 2 shift means 130 comprises the 1 – 2 shift valve 130, a 1 – 2 solenoid 132, and a spring 131', and the 1 – 2 solenoid 132 comprises a plunger 133, a spring 133', a coil 132' and so on. A valve chamber 121' defined between the right end of the 1 – 2 shift valve 131 and the 1 – 2 solenoid 132 is supplied with oil pressure from the oil passage 121 via an orifice 121a. The 1 – 2 solenoid 132 is controlled with signals from the electrical control section. When the 1 – 2 solenoid coil 132' is not energized, the plunger 133 is moved to its leftward position by the spring 133' so that a solenoid orifice 132b is closed to shut the valve chamber 121'. Consequently, the 1 – 2 shift valve 131 is moved to its leftward position against the spring pressure of the spring 131' by virtue of the oil pressure in the valve chamber 121'. When the 1 – 2 solenoid coil 132' is energized, the plunger 133 is moved to its rightward position by virtue of the electromagnetic force so that the oil pressure in the valve chamber 121' is exhausted to an exhaust port 132a through the orifice 132b. In this case, the dimensions of the orifice 121a is so small as compared with the orifice 132b that no residual pressure will be produced in the valve chamber 121'. Consequently, the 1 – 2 shift valve 131 is moved to the rightward position under the spring pressure of the spring 131'.

The 2 – 3 shift means 135 comprises a 2 – 3 shift valve 136, a spring 136' and a 2 – 3 solenoid 137, and the 2 – 3 solenoid 137 comprises a coil 137', a spring 138', a plunger 138 and so on. A valve chamber 124' defined between the 2 – 3 shift valve 136 and the 2 – 3 solenoid 137 is supplied with the oil pressure from the oil passage 124 through an orifice 124a. When the 2 – 3 solenoid coil 137' is energized with a signal from the electrical control section, the 2 – 3 shift valve 136 is moved to its rightward position in a similar manner as described for the 1 – 2 shift means. Here, the dimension of the orifice 124a is made sufficiently smaller than a solenoid orifice 137b so that no residual pressure will be produced in the valve chamber 124'. When the coil 137' is not energized, the 2 – 3 shift valve 136 is moved to its leftward position by virtue of the oil pressure in the valve chamber 124'.

Thus, according to the positions of the manual valve 120, 1 – 2 shift valve 131 and 2 – 3 shift valve 136 established as described above, the various hydraulic servos in the transmission are actuated to determine the corresponding gear positions, while the positions of the shift valves 131 and 136 are determined according to the presence (energization) or absence (deenergization) of the signals from the electrical control section. However, with the manual valve 120 in the 2 or L position, the oil passage 126 is exhausted so that no oil pressure is supplied to the rear clutch servo chamber 7a and the front brake band release side servo chamber 22b irrespective of the energization or deenergization of the 2 – 3 solenoid 137. When the manual valve 120 is in the R position, the oil passage 124 is exhausted so that the oil pressure in the valve chamber 124' is exhausted and thus the 2 – 3 shift valve 136 is moved to the rightward position under the spring pressure of the spring 136' irrespective of whether the 2 – 3 solenoid 137 is energized or not.

The following table shows the summary of the energization and deenergization of the solenoids and the gear positions during the operations in the forward speed gears:

| Manual valve position | D | | | 2 | L | | |
|---|---|---|---|---|---|---|---|
| Gear position | 1st speed | 2nd speed | 3rd speed | 1st speed | 2nd speed | 1st speed | 2nd speed |
| 1–2 solenoid | Energized | Deenergized | Deenergized | | | Energized | Deenergized |
| 2–3 solenoid | Energized | Energized | Deenergized | | | Deenergized | Energized |

As will be apparent from this table, the conditions of the 1 – 2 solenoid for engaging the first and second speed gears with the manual valve in the L position are exactly contrary to the conditions required when the manual valve 120 is in the D or 2 position. Thus, when both the 1 – 2 and 2 – 3 solenoids are not energized owing to the failure of the electrical control section, for example, the L position-first speed, 2 position-second speed and D position-third speed can still be engaged, thereby enabling so-called manual operation of the gears.

Next, the signal generating means for energizing the 1 – 2 and 2 – 3 solenoids will be explained with reference to FIG. 5. The signal generating means generally comprises a power supply means 250 and a computer circuit 200 including vehicle speed and engine load detectors, 1 – 2 and 2 – 3 shift solenoid driving circuits and so on.

The power supply means 250 supplies various signals representing the P, R, N, D, 2 and L positions to the computer circuit 200 through a line 251'' from a shift position signal generator 251 comprising a shift position switch which is directly connected to a positive terminal 253 of a battery by way of an ignition switch 254 through a fuse 255 and linked to the transmission shift lever and a switching circuit. The power supply means 250 also supplies a constant voltage to the component elements of the computer circuit from a power supply (constant voltage source power supply) 252 via a line 252'.

THe computer circuit 200 comprises a vehicle speed detector 201, a waveshaping and amplifying circuit 202, a D – A converter 203, a D and 2 position 1 – 2 shift discrimination circuit 204 (hereinafter referred to as a D position 1 – 2 shift discriminator), a hysteresis circuit 205, an L position 1 – 2 shift discriminator 206, a hysteresis circuit 207, a gating circuit 212, an amplifier circuit 213, a 1 – 2 solenoid 132, 132, a 2 – 3 shift discriminator 208, a hysteresis circuit 209, an amplifier circuit 214, a 2 – 3 solenoid 137, a throttle position switch 210, and a throttle position voltage generator 211. Schematic diagrams of certain ones of the above circuits are shown and explained in a related patent to Ito et al., U.S. Pat. No. 3,650,161, and the general operation of the circuit with these elements will now be explained.

As schematical'y shown in FIG. 1, the vehicle speed detector 201 comprises a toothed disk 72 of a magnetic material securely mounted on the transmission output shaft 18 and a sensor 71 composed of a permanent magnet and a coil wound on the former which is housed in a non-magnetic casing secured on a transmission housing 30. The detector generates sine wave signals having a frequency proportional to the number of revolutions of the transmission output shaft 18 (i.e., the vehicle speed). The signal is changed into a rectangular signal and amplified in the waveshaping and amplifying circuit 202 and the rectangular signal is then converted into a positive DC voltage signal proportional to the vehicle speed in the D – A converter 203. This DC voltage signal (vehicle speed signal $E_n$) is then supplied to the D position 1 – 2 shift discriminator 204, L position 1 – 2 shift discriminator 206 and 2 – 3 shift discriminator 208 through lines 203', 203'' and 203''', respectively.

Figure 6:
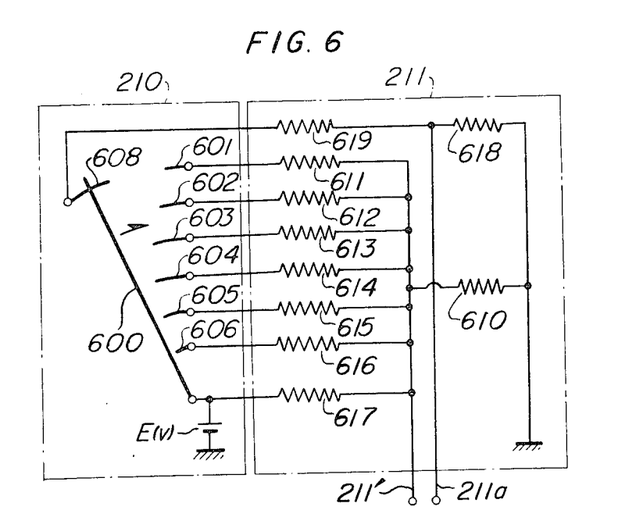
FIG. 6 is a circuit diagram of a throttle position responsive electrical signal generator.

The throttle position switch 210 comprises, as shown in FIG. 6, a movable contact 600 and fixed contacts 601, 602, 603, 604, 605 and 606, and the movable contact 600 successively engages the fixed contacts 601 through 606 according to the throttle openings (FIG. 6 corresponds to the fully closed throttle). The movable contact 600 is connected to a constant voltage source $E_{(v)}$. Also as shown in FIG. 6, the throttle position voltage generator 211 comprises a resistor 610 having one end thereof connected to the ground, resistors 611, 612, 613, 614, 615 and 616 connected to the resistor 610 at one end thereof and connected respectively to the fixed contacts 601 through 606 at the other end, and a resistor 617 connected to the resistor 610 at one end and to the movable contact 600 at the other end.

With such an arrangement wherein the resistance values of the resistors 610 to 617 are appropriately preset, as the movable contact 600 moving with the opening and closing of the throttle valve moves in the direction of opening of the throttle starting from its position corresponding to the completely closed state of the throttle valve shown in FIG. 6 to come into contact with the fixed contacts sequentially in the order of 606, 605, 604, 603, 602 and 601, there is produced a stepwise rising voltage on a line 211'. At the position of the movable contact 600 corresponding to the fully closed state of the throttle valve, the voltage appearing on the line 211' is a division of a constant voltage E(v) obtained by dividing it in a ratio of the resistance of the resistor 617 to that of the resistor 610. When the throttle opening is increased and the movable contact 600 is brought into contact with the fixed contact 606, the voltage appearing on the line 211' is a division of the constant voltage E(v) obtained by dividing it in a ratio of the resistance of a parallel combination of the resistors 616 and 617 to that of the resistor 610. As the throttle opening increases, the number of resistors connected in parallel with the resistor 617 increases. At the position of the movable contact 600 corresponding to the fully-opened state of the throttle valve, the voltage appearing on the line 211' is a division of the constant voltage E(v) obtained by dividing it in a ratio of the resistance of a parallel combination of the resistors 611 through 617 to that of the resistor 610. A fixed contact 608 and resistors 618 and 619 are provided to effect starting in the third speed gear when the throttle opening is small, as stated in the object of this invention, and the position of the fixed contact 608 is preset to satisfy the following conditions. When the throttle valve stays between the fully closed position and the position of about one third of the full opening, the movable contact 600 is in contact with the fixed contact 608 and a division of the constant voltage E(v) obtained by dividing it in a ratio of the resistance of the resistor 619 to that of the resistor 618 appears on a line 211a. When the throttle valve moves beyond the position of the above-mentioned opening, the movable contact 600 leaves the fixed contact 608 so that no voltage appears on the line 211a.

The D position 1 – 2 shift discriminator 204, L position 1 – 2 shift discriminator 206 and 2 – 3 shift discriminator 208 are similar in construction and they may comprise a conventional differential comparator circuit which compares the values of the vehicle speed signal $E_n$ and the throttle position signal $E_\theta$ to produce a 0 (no voltage) or 1 (voltage present) signal according to the result of the comparison. In other words, the vehicle speed signal $E_n$ and the throttle position signal $E_\theta$ are applied to the differential comparator circuit through suitable voltage dividing resistors and the dividing ratios of these voltage dividing resistors are so determined that the D position 1 – 2 shift discriminator 204 generates a 0 signal when $E_n \geq AE_\theta$ and the 2 – 3 shift discriminator 208 generates a 0 signal when $E_n \geq BE_\theta$ (B>A). The purpose of the hysteresis circuits 205 and 209 is to vary the voltage dividing ratios of the said dividing resistors when the output signals of the discriminators 204 and 208 are 0, thereby preventing hunting in the output signals of these discriminators. Consequently, the output of the D position 1 – 2 shift discriminator 204 is 1 when $E_n \leq A'E_\theta$ (A'<A) and the range $A'E_\theta < E_n < AE_\theta$ constitutes the so-called hysteresis region where the preceeding conditions are maintained. Similarly, the output of the 2 – 3 shift discriminator 208 is 1 when $E_n \leq B'E_\theta$ (B'<B) and the range $B'E_\theta < E_n < BE_\theta$ constitutes the hysteresis region. The L position 1 – 2 shift discriminator 206 is so constructed that the input signals $E_n$ and $E_\theta$ are utilized in the discriminator in a reverse relation and therefore a 1 signal is produced when $E_n \geq CE_\theta$ and a 0 signal is produced when $E_n \leq C''E_\theta$. Then, the range $C'E_\theta < E_n < CE_\theta$ constitutes the hysteresis region. The reason for reversing the discrimination conditions (the relationship between $E_n$ and $E_\theta$) of the L position 1 – 2 shift discriminator 206 resides in the fact that the conditions of the 1 – 2 solenoid 132 for the gear shifting requirements are reversed when the manual valve 120 is in the D or 2 position and when it is in the L position as previously explained (See the aforementioned table).

The gating circuit 212 functions so that the output signal of the L position 1 – 2 discriminator 206 is permitted to appear on a line 212' when the manual valve 120 is in the L position, whereas the output signal of the D position 1 – 2 shift discriminator 204 is permitted to appear on the line 212' when the manual valve 120 is in any other position. The L position signal generated from the shift position signal generator 251 is employed as the switching signal for the gating circuit 212.

The amplifier circuits 213 and 214 amplify the 1 output signals of the respective discriminators to a voltage level sufficient to energize the 1 – 2 solenoid 132 and the 2 – 3 solenoid 137.

With the arrangement described above, the electrical signals required for energizing and deenergizing the solenoids as summarized in the aforementioned table can be obtained.

Next, the principal feature of the present invention, that is, the control circuit for starting the transmission in the third speed will be explained. This control circuit compares a signal representing the vehicle speed and a signal responsive to the throttle opening which represents the engine load condition, whereby the energization and deenergization of the 1 – 2 solenoid 132 and the 2 – 3 solenoid 137 are controlled according to the result of the comparison.

Figure 5:
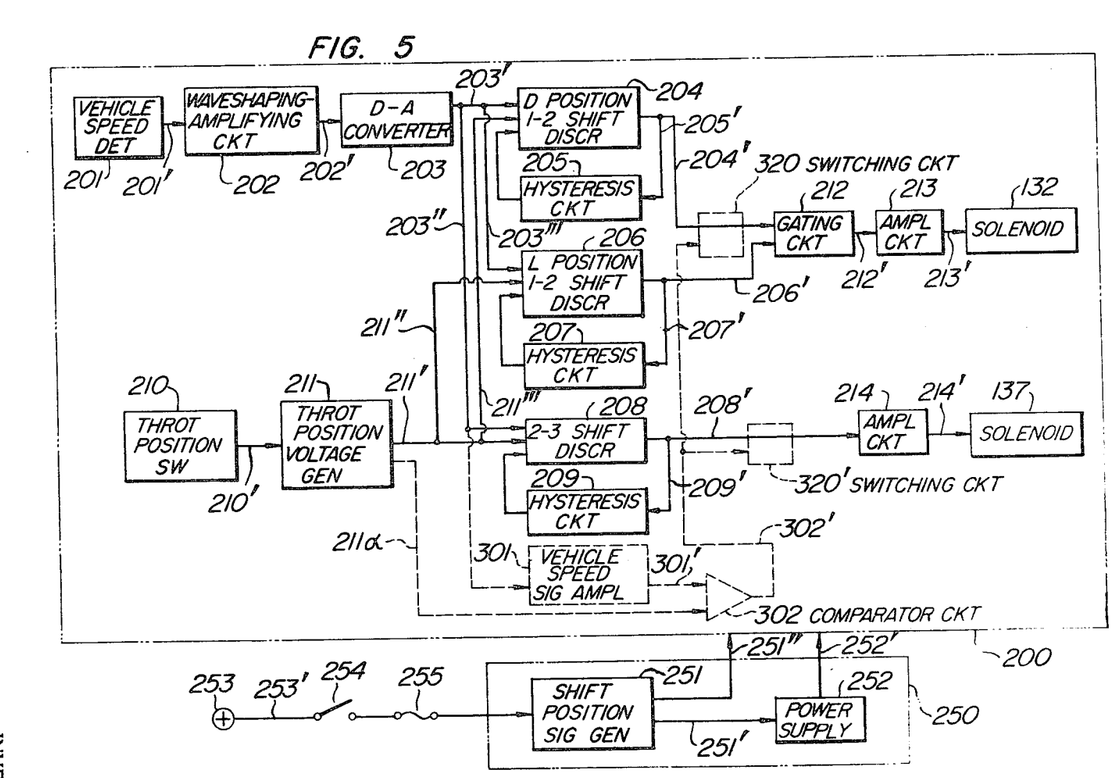
FIG. 5 is a block diagram of an electrical circuit for controlling the transmission shift signals.
Figure 7:
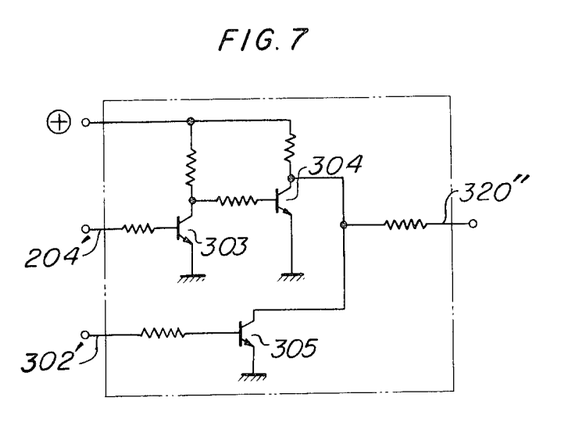
FIG. 7 is a block diagram of an electrical circuit for controlling the shift signals for accomplishing the starting in third speed according to the present invention.

The control circuit comprises, as shown in FIG. 5 with dotted lines, a vehicle speed signal amplifier circuit 301, a comparator circuit 302, and switching circuits 320 and 320'. The comparator circuit 302 receives the vehicle speed signal amplified in the amplifier circuit 301 and the predetermined throttle position signal (constant voltage $E_o$) generated by the throttle position voltage generator 211. The switching circuits 320 and 320' are identical in construction and are adapted to respectively control the output signals of the D position 1 – 2 shift discriminator 204 and the 2 – 3 shift discriminator 208 with the output signal of the comparator circuit 302. The switching circuit 320 is constructed as shown in FIG. 7.

In operation, the vehicle speed signal $E_n$ is amplified in the vehicle speed signal amplifier circuit 301 to $\alpha E_n$ ($\alpha$ is the amplification factor). The comparator circuit 302 compares the signal $\alpha E_n$ and the predetermined throttle position signal $E_o$ so that a 1 signal is generated when $E_o \geq \alpha E_n$ and a 0 signal is generated when $E_o < \alpha E_n$ or in the absence of the signal $E_o$. When the output signal of the comparator circuit 302 is 1, the 1 signal is supplied to the switching circuit 320 through a line 302' so that a transistor 305 is rendered conductive to always produce a 0 signal on an output line 320''. On the other hand, when the output signal of the comparator circuit 302 is 0, the transistor 305 is rendered nonconductive and thus the output signal on the output line 320'' depends on whether a transistor 304 is conductive or non-conductive. When the signal on the line 204', that is, the output signal of the D position 1 – 2 shift discriminator 204 is 1, a transistor 303 is rendered conductive and the transistor 304 becomes nonconductive so that the signal on the output line 320'' changes to 1. When the output signal of the discriminator 204 is 0, the transistor 303 becomes nonconductive and the transistor 304 conducts so that the signal on the output line 320'' changes to 0. In other words, when the output signal of the comparator circuit 302 is 1, the switching circuit 320 produces a 0 signal to keep the 1 – 2 solenoid 132 in a deenergized state irrespective of the output signal of the D position 1 – 2 shift discriminator 204; otherwise the switching circuit 320 permits the output signal of the discriminator 204 to pass therethrough. Similarly, the switching circuit 320' maintains the 2 – 3 solenoid in a deenergized state irrespective of the output signal of the 2 – 3 shift discriminator 208, when the output signal of the comparator circuit 302 is 1.

Figure 8:
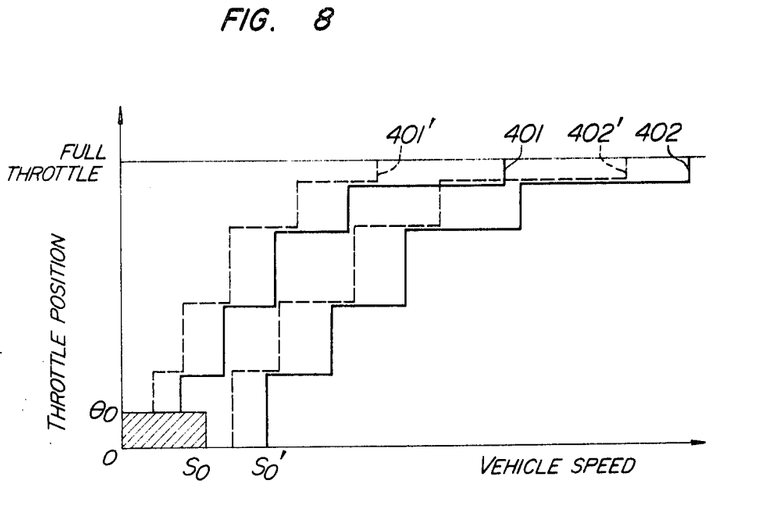
FIG. 8 is a shift line diagram corresponding to the D position which illustrates the region for the third speed starting.

When the predetermined throttle position is selected to be in the order of ⅓ throttle and the amplification factor $\alpha$ is also selected such that the vehicle speed corresponding to a vehicle speed signal $E_n$ that provides the condition $\alpha E_n = E_o$ is below a vehicle speed at which an upshift from the second speed to the third speed occurs under low engine load conditions (such as the condition corresponding to a throttle position less than ¼ throttle). With these adjustments, when the transmission shift lever is in the D position, the third speed is engaged when the throttle opening is less than the predetermined throttle opening and the vehicle speed is less than the one that provides the condition $\alpha E_n = E_o$. FIG. 8 illustrates a shift line diagram corresponding to the D position, and lines 401, 401', 402 and 402' represent the shift lines for the 1 – 2 upshift, 2 – 1 downshift, 2 – 3 upshift and 3 – 2 downshift, respectively, where $\theta_o$ is the predetermined throttle position, $S_o$ is the vehicle speed that provides the condition $\alpha E_n = E_o$ and the hatched portion represents the range in which the third speed is obtainable according to the present invention.

As will be apparent from FIG. 8, many shifting characteristics of different kinds can be obtained by suitably selecting the predetermined throttle opening $\theta_o$ and the vehicle speed $S_o$. For example, the preset throttle position $\theta_o$ and the vehicle speed $S_o$ may be selected to be small enough so that the third speed is obtainable only when the throttle is fully closed and the vehicle is at rest, thereby performing the previously mentioned rest position holding (or back retarding) function. On the other hand, if the vehicle speed $S_o$ is selected to be a vehicle speed $S'_o$ at which the 2 – 3 upshift occurs under low engine load conditions, for a moderate acceleration with a throttle position less than the predetermined throttle position $\theta_o$, the third speed can be maintained throughout the trip thereby affording smooth driving without any gear changing operations. Furthermore, it is possible to eliminate the vehicle speed signal amplifier circuit 301 and the comparator circuit 302 and to apply the predetermined throttle position signal $E_o$ as a 1 signal directly to the switching circuits 320 and 320'.

The preferred embodiment described above has shown an example in which the controls for the third speed starting are carried out in response to those signals representing the throttle position and the vehicle speed or the throttle position alone, other engine load responsive signals such as the signals responsive to the engine intake manifold vacuum, engine revolutions and the slip factor between the pump and the turbine of a torque converter may be equally utilized.

While a specific embodiment of the present invention has been described as applied to an automatic transmission having three forward speeds and one reverse, it should be apparent to those skilled in the art that the present invention may be equally applied to many other automatic transmissions of different forms without departing from the spirit and the scope of the present invention.

We claim:

1. In a vehicle automatic transmission comprising a speed change gear and engaging means with hydraulic servos for accomplishing the gear changing operations of the speed change gear, a control system comprising: hydraulic pressure supply control means for controlling the supply of hydraulic pressures to said engaging means hydraulic servos vehicle driving condition responsive electrical signal generating means, shift control means responsive to said vehicle driving condition responsive electrical signals for generating electrical signals to actuate said hydraulic pressure supply control means, and drive speed setting means responsive to the vehicle driving condition responsive electrical signals including at least a low engine load signal so as to generate electrical signals for engaging the transmission in the third speed gear irrespective of the electrical signals generated by said shift control means.

* * * * *